250-203.R 56

Oct. 15, 1968 G. V. ZITO ETAL 3,406,287
RADIATION SENSITIVE DEVICE FOR DETECTING SUN
IN A SELECTED FIELD OF VIEW
Filed June 26, 1963 2 Sheets-Sheet 1

INVENTORS
GEORGE V. ZITO
EDWARD A. CHILTON
BY [signature]
AGENT

INVENTORS
GEORGE V. ZITO
EDWARD A. CHILTON
BY Arthur T. Groninger
AGENT 3,406,287

RADIATION SENSITIVE DEVICE FOR DETECTING SUN IN A SELECTED FIELD OF VIEW

George V. Zito, Northvale, and Edward A. Chilton, Westwood, N.J., assignors to The Bendix Corporation, Teterboro, N.J., a corporation of Delaware Filed June 26, 1963, Ser. No. 290,809
9 Claims. (Cl. 250—209)

The invention relates to a sun detection system capable of detecting the presence of the sun in a selected field of view, and more particularly, to sun detection apparatus including a trigger and flip-flop memory circuit especially adapted to be used with a solar cell.

The present invention includes two solar cells disposed so that rays from the sun may only impinge upon the cells when the sun is in the selected field of view. By utilizing two solar cells, the present invention is capable of indicating in which half of the selected field of view the sun is present, if it is present at all. Each of the solar cells is connected to an amplifying trigger circuit. The signals applied to the amplifying trigger circuits will vary in amplitude depending on the angle at which the rays from the sun impinge upon the solar cell. The amplifying trigger circuit, having high input sensitivity, produces a constant amplitude output signal regardless of the angle of incidence of the sun rays.

One of the many uses for the information represented by output signals from the trigger circuits is to indicate whether conditions, in a selected field of view, are suitable for photography. The system may be employed on spaceborne vehicles with the output signals transmitted to ground telemeters or applied to the control system of the vehicle to reposition the vehicle to an attitude suitable for photography.

The output signals from the trigger circuits are also fed to a memory flip-flop circuit. If rays from the sun are not impinging on either of the solar cells, the memory circuit performs the function of remembering which of the cells was last impinged by sun rays.

An object of the present invention is to provide a device capable of indicating whether or not the sun is in a selected field of view.

Another object to provide a device capable of remembering the last position of the sun in a selected field of view.

Another object is to provide an amplifying trigger circuit having high input sensitivity.

Another object of the present invention is to provide solar cells with external circuit means to linearize solar cell output so as to preclude spurious triggering of the amplifying trigger circuit.

Another object of the present invention is to provide a variable gain amplifying trigger circuit having a relatively high gain for rapid triggering when in a state of low current conduction.

Another object of the present invention is to provide an amplifyin trigger circuit having a positive feedback loop and voltage sensitive means for controlling the feedback.

Another object of the present invention is to provide an amplifying trigger circuit having a voltage sensitive means for reducing its output impedance when the trigger circuit reaches a state of maximum conduction.

Another object of the present invention is to limit response time of the trigger circuit to preclude the possibility of flashing lights, noise, etc., triggering the circuit.

Another object of the present invention is to establish operating potentials relatively independent of temperature.

Another object of the present invention is to provide isolating resistors in output terminals of the circuit to thereby preclude short circuits in external circuitry from affecting the remaining outputs.

Another object of the present invention is to provide an emitter follower to amplify memory circuit output to compensate for the extra current requirement should a short circuit occur.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 2:
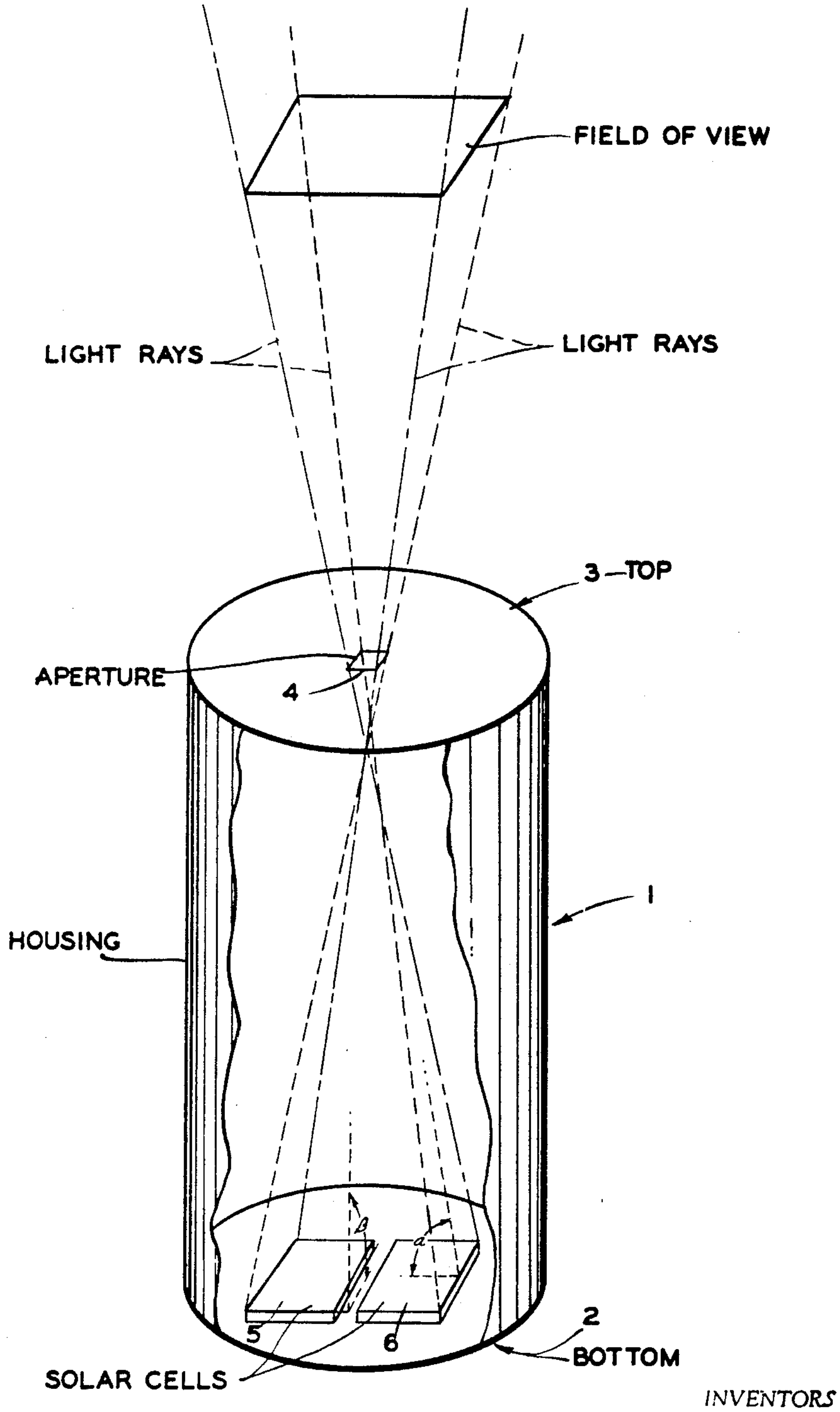
FIGURE 2 is a diagrammatic view of a solar cell housing employed in the present invention with two solar cells so disposed therein that sun rays may only impinge upon the cells when the sun is in a selected field of view.

Referring to FIGURE 2, housing 1 has a bottom closure 2 and a top closure 3, the latter having a central square aperture 4 therein. Conventional silicon solar cells 5 and 6 of PN junction type are secured to the bottom closure in the field of view within the housing 1 disposed in spaced coplanar relation. Solid cells 5 and 6 may be of the type shown and described in "Proceedings of I.E.E.E.," May 1963, "Recent Research on Photovoltaic Solar Energy Converters" by Joseph J. Loferski. The adjacent edges of solar cells 5, 6 are spaced a distance equal to the width of aperture 4 and so disposed in relation to the aperture that rays entering through aperture 4, perpendicular to bottom wall 2, will not impinge on either solar cell 5 or 6. Thus, rays entering the central aperture 4 may only impinge upon one cell at one time or upon neither cell. It is apparent that rays of the sun must emanate from the pyramidal field of view defined by angles $\alpha$ and $\beta$ in order to impinge on solar cells 5 and 6. Solar cell characteristics are such that under dark conditions internal cell resistance is high and generated voltage low.

Figure 1:
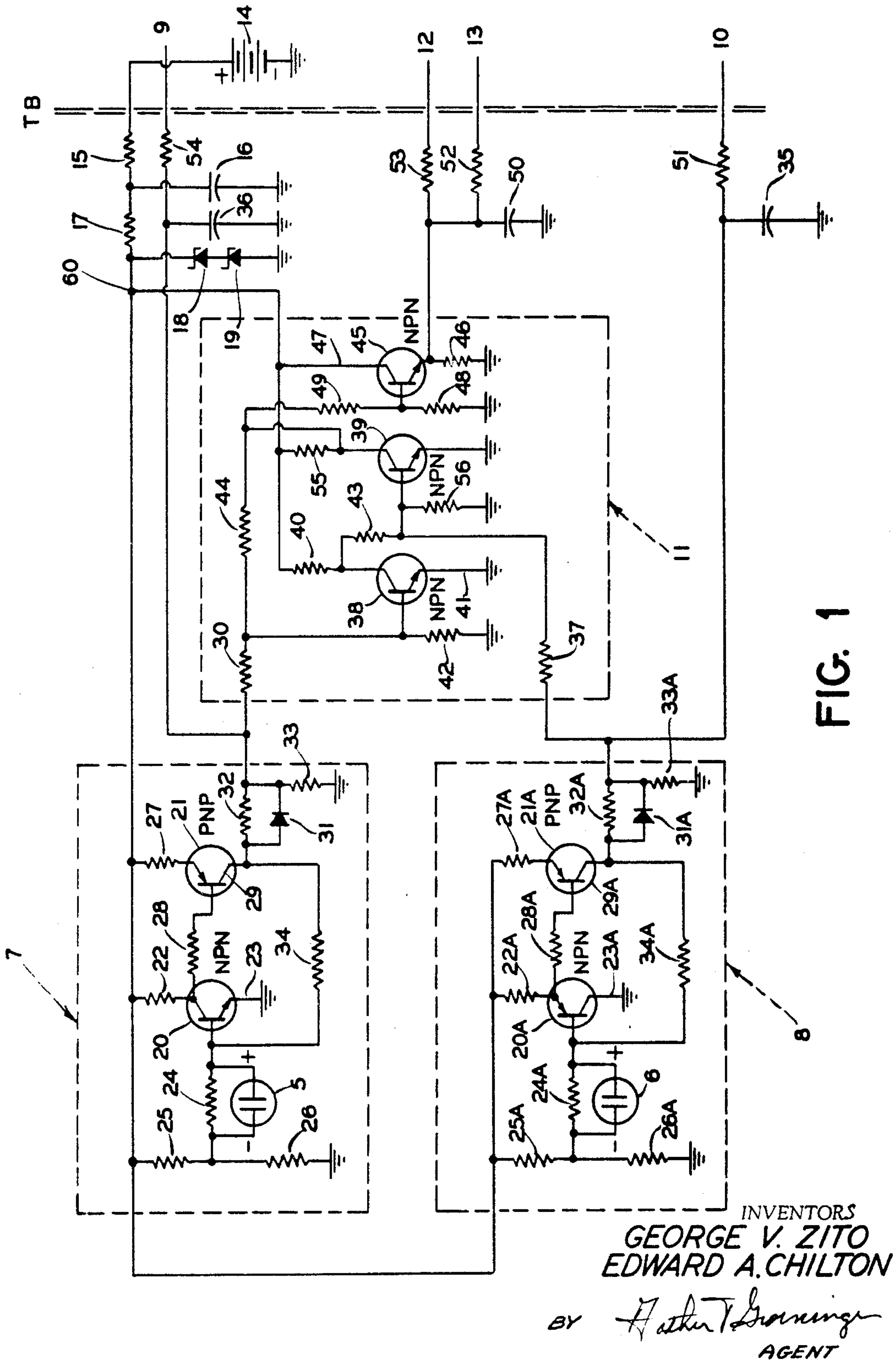
FIGURE 1 is a circuit diagram of a bistable multivibrator circuit and the trigger circuits embodying the present invention.

Referring to FIGURE 1, the circuit consists essentially of two channels 7, 8, each including a solar cell and an amplifying trigger circuit, whose outputs are fed to outputs 9, 10, respectively, on terminal board TB. The outputs from channels 7 and 8 are also adapted to trigger flip-flop memory circuit 11 whose output is fed to outputs 12, 13. Output 9 yields a positive signal for the condition where solar energy is impinging on solar cell 5 and a zero signal for the condition when the the solar energy is not impinging on solar cell 5; output 10 performed the same function for solar cell 6; and output 12 performs a memory function which presents a positive signal for the condition where the solar energy is or last was impinging on solar cell 5 and a zero signal for the condition where the solar energy is or last was impinging on solar cell 6. Output 13 is an auxiliary output identical to output 12. The system of the present invention is particularly adapted to be used on spaceborne vehicles wherein outputs 9, 10, 12, 13 are capable of being fed to the control system for the vehicle or of being transmitted to a telemeter to indicate the sun's present or last position in relation to a selected field of view.

A suitable source of positive potential, identified as battery 14, is provided to establish bias voltages to operate transistors of the circuit. Resistor 15 and capacitor 16 filter out line noises and possible radio frequencies in the power supply. Reliable operation of a transistor requires that the bias voltage remain stable. Current drawn by the circuit will vary due to changing load requirements and variation of collector current with temperature. These factors tend to preclude a stable bias voltage.

In order to compensate for this, resistor 17 and Zener diodes 18 and 19 are provided to establish a constant operating potential at junction 60. The voltage drop across the Zener diodes 18, 19 remains constant even though the amount of current flowing through the Zener diodes varies. When the current drawn by the load increases, current is diverted to the load from Zener diodes 18, 19. A decrease in current drawn by the load causes a corresponding increase in the current drawn by Zener diodes 18, 19. When, hereinafter, an element of the circuit is described as being connected to the positive terminal of battery 14, it is to be understood that such connection is made through Zener diodes 18, 19, resistor 17, and RC network 15, 16; the voltage applied to any such element is the constant positive potential of the junction point 60. The potential of the junction point 60 is approximately twice as large as the output voltages at 9, 10, 12, and 13.

Channel 8 is identical to channel 7, therefore, only channel 7 will be described. Parts in channel 8 corresponding to parts in channel 7 have been indicated by the numerals bearing the suffix A. Channel 7 includes solar cell 5 and an amplifying trigger circuit comprising transistors 20 and 21 with the positive terminal of solar cell 5 connected to the base of transistor 20. Transistors 20 and 21 are, respectively, NPN and PNP junction transistors. Each transistor could be replaced by one of opposite conductivity so long as the polarity of the solar cell 5 and the polarities of all supply voltages in the circuit, as described hereinafter, are reversed.

The collector of transistor 20 is connected by a resistor 22 to the positive terminal of the battery 14. The emitter of transistor 20 is connected to ground by a conductor 23. The base of transistor 20 is also connected to the positive terminal of the battery 14 by solar cell 5, resistor 24, and a voltage divider network comprising resistors 25 and 26. By making resistor 25 large in comparison to resistor 26, a voltage division is effected whereby only a small fraction of the potential of the junction point 60 is applied to the base of transistor 20 thereby maintaining it slightly above ground potential. Transistor 20 is quiescently held at cutoff by this voltage division, i.e., the bias voltage at the junction of these two resistors is not high enough in a positive direction to cause conduction with the grounded emitter. To render transistor 20 conductive, an additional positive voltage must be applied to the base. This additional positive voltage is supplied by solar cell 5 when it is impinged by solar rays.

The solar cell 5 is connected in series between the positive terminal of battery 14 and the base of transistor 20. The internal resistance of solar cell 5 will vary with temperature. In order to minimize the effect of the solar cell in determining the quiescent bias point of transistor 20, resistor 24 is connected across the solar cell 5 to fix the maximum apparent resistance of the solar cell 5. Changes in temperature will also vary the magnitude of the voltage generated by solar cell 5. Additionally, resistor 24 serves as a current load which tends to linearize the output from solar cell 5, thereby precluding spurious triggering of the transistor 20 and minimizing differences in outputs between solar cells 5 and 6.

The emitter of transistor 21 is connected by a resistor 27 to the positive terminal of battery 14. The base of the transistor 21 is connected by resistor 28 to the collector of transistor 20. When transistor 20 is not conducting, the collector voltage of transistor 20 is slightly below the positive voltage of junction point 60 and this voltage is applied to the base of transistor 21 through resistor 28. The emitter of transistor 21 is also at a voltage slightly below the potential of junction point 60. In order to render transistor 21 conductive, the base must be negative with respect to its emitter. When transistor 20 is not conducting, transistor 21 will not conduct since forward bias in the base-emitter of transistor 21 is not established.

When transistor 20 begins to conduct, its collector voltage drops. The drop in collector voltage is applied to the base of transistor 21 by resistor 28 to establish forward bias in the base emitter circuit of transistor 21 rendering transistor 21 conductive.

When transistor 21 begins to conduct, the voltage of its collector 29 begins to rise. The collector 29 is connected to the output terminal 9 and to the input resistor 30 of the memory circuit 11 by diode 31 and resistors 32 and 33. Little of the rise in voltage at collector 29 will appear at the output terminal 9 or at the input resistor 30 to the memory circuit 11 because diode 31 is in a low current, high resistance condition. A voltage drop will be developed across resistor 32 as well as resistor 33. Only the small drop at resistor 33 will appear at the output 9 and input resistor 30. The voltage rise across resistors 32 and 33 is nevertheless coupled by positive feedback resistor 34 to the base of transistor 20, reinforcing the original rise in a regenerative manner. This process continues until the voltage of collector 29 has attained its maximum positive value at which point diode 31 is conducting heavily and has moved to a low resistance condition. The collector current of transistor 21 will now bypass resistor 32 permitting most of the voltage drop to be developed across resistor 33 and appear at output 9 and input 30. When transistors 20 and 21 are in a state of low current condition, the voltage rise across resistors 32 and 33 is fed back to the base of transistor 20 for rapid triggering. When transistors 20 and 21 are in a state of high current conduction, only the voltage rise across resistor 33 is fed back to the base of transistor 20. Thus, transistors 20 and 21 act as a variable gain amplifier with gain decreasing as current conduction increases. The trigger circuit of the present invention has the desirable feature of low output impedance during high current conduction when the output from the trigger is ready to be applied to the output terminals of the system and high output impedance when it is desired to have maximum positive feedback for rapid triggering.

A zero signal at output 9 indicates that the sun is not impinging on solar cell 5 while a positive signal indicates that the sun is presently impinging on the solar cell 5.

In an identical manner, channel 8 produces a signal at output 10 indicating whether or not the sun is impinging on solar cell 6. Capacitors 35 and 36 limit response time of the circuit to preclude to possibility of flashing lights, noise, etc., triggering the circuit.

The outputs from channels 7 and 8 are coupled to flip-flop memory circuit 11 via input limiting resistors 30 and 37, respectively. In response to a signal from either channel 7 or 8, memory circuit 11 produces a signal at output 12 indicating on which solar cell, 5 or 6, the sun is or last was impinging.

The flip-flop memory circuit 11 comprises transistors 38 and 39 of the NPN junction type, one of which is conducting at any given time. The collector of transistor 38 is connected by a resistor 40 to the positive terminal of the battery 14. The emitter of transistor 38 is connected to ground by a conductor 41. The base of transistor 38 is connected to the output from channel 7 via input limiting resistor 30 and a voltage divider resistor 42. When the sun is impinging on solar cell 5, the rise in the voltage at collector 29 of transistor 21 is applied to the base of transistor 38 by resistor 33 and input limiting resistor 30. This establishes forward bias in the base emitter circuit of transistor 38 enabling it to conduct.

Assume that transistor 39 is conducting, as described above, the output signal from channel 7 applied at coupling resistor 30 causes transistor 38 to conduct. The resulting rise in collector current in transistor 38 causes its collector voltage to fall. The collector of transistor 38 is coupled to the base of transistor 39 via resistor 43. The change in collector voltage of transistor 38 is applied to the base of transistor 39 making the base less positive. This reduces forward bias in the base emitter circuit of the transistor 39; conduction in transistor 39 begins to decrease. The collector current of transistor 39 begins to decrease and the collector voltage changes from zero to a positive value. This change in voltage is coupled to the base of transistor 38 by resistor 44 making the base more positive and increasing the conductivity of the transistor 38. The regenerative feedback continues until transistor 38 is in saturation and the transistor 39 is cutoff. The coupling by resistor 44 between the collector of transistor 39 and the base of transistor 38 will maintain the transistor 38 in a conducting state even if a positive voltage is no longer emanating from channel 7.

Assume now that the solar rays which were impinging on solar cell 5 have shifted to solar cell 6. The transistors in channel 8 begin to conduct.

A positive trigger voltage is applied to the base of transistor 39 via limiting resistor 37 and voltage divider resistor 56 causing transistor 39 to conduct in similar manner as transistor 38 was triggered as hereinabove described. The rise in collector current in transistor 39 causes the collector voltage to fall. This change in voltage is coupled to the base of transistor 38 via resistor 44 reducing the forward bias in the base emitter circuit of transistor 38; conduction in transistor 38 begins to decrease. The collector current of transistor 38 begins to decrease and the collector voltage changes from zero to a positive potential. This change in voltage is coupled to the base of transistor 39 by resistor 43, making the base more positive and increasing the conductivity of the transistor 39. The regenerative feedback continues until transistor 39 is in saturation and the transistor 38 is cutoff. The coupling by resistor 43 between the collector of transistor 38 and the base of transistor 39 will maintain the transistor 39 in a conducting state even if a positive voltage is no longer emanating from channel 8. The transistor 38 will remain in this cutoff condition until a trigger voltage from channel 7 is applied to its base.

Transistor 45 is an emitter follower output stage which functions as a current amplifier and furnishes memory information from transistor 39 to low impedance lines at outputs 12 and 13. The emitter of transistor 45 is connected to ground by a resistor 46. The collector of transistor 45 is connected to the positive terminal of battery 14 by conductor 47 and has the same positive potential as that of the junction point 60. The base of transistor 45 is connected to the collector of transistor 39 by a voltage divider network comprising resistors 48 and 49. The collector of transistor 39 is connected to the positive terminal of battery 14 by resistor 55.

When transistor 39 is not conducting, transistor 45 will conduct because a positive bias voltage is applied through resistors 55 and 49 to the base of transistor 45 establishing forward bias in the base emitter circuit. When transistor 39 is conducting, the collector voltage of transistor 39 is near ground potential. The bias voltage at the junction of resistors 48 and 49 is then not high enough in a positive direction to render transistor 45 conductive.

Short circuits frequently occur in a telemetering system. Isolating resistors 51, 52, 53, 54 isolate the system from short circuits in external circuitry to outputs 9, 10, 12, and 13. Should a short circuit occur in one output, the remaining outputs are not affected.

The emitter follower transistor 45 functions as a buffer stage to prevent excessive current drain from the flip-flop memory circuit 11 under normal operations or under shorted output conditions on output lines 12, 13. By the use of the buffer stage, the voltage level at the emitter of emitter follower transistor 45 remains fairly constant whether the line is operating normally or under shorted conditions. In addition, the use of emitter follower transistor 45 allows the output lines 12, 13 to be at a lower impedance level than if the outputs were taken from the memory circuit directly.

If a signal appears at outputs 12 and 13, then transistors 38 and 45 are conducting and transistor 39 is not conducting indicating that the sun is or last was impinging on solar cell 5. If no signal appears at outputs 12 and 13, then transistor 45 is not conducting but transistor 39 must be conducting indicating that the sun is or last was impinging on solar cell 6. A capacitor 50 at outputs 12 and 13 precludes the generation of radio noise by the circuit.

*Operation*

The operation of the device will now be described. Solar rays impinge on solar cell 5. Resistor 24 connected across solar cell 5 minimizes the effect of changes in solar cell output and internal resistance due to temperature variation. Solar cell 5 generates a voltage which is applied to the base of transistor 20 making transistor 20 conductive. The collector voltage of transistor 20 begins to drop. This drop develops a negative-going voltage which is applied to the base of transistor 21 making transistor 21 conductive. The collector of transistor 21 is connected to output 9 by a diode 31 and resistors 32 and 33. Diode 31 connected across resistor 32 is in low current, high resistance condition. The voltage drop across resistor 33 is applied to the output terminal 9. Little of the initial rise in collector voltage will be applied to output 9 because the small rise in voltage will appear across resistors 32 and 33 in series rather than resistor 33 alone. Nevertheless, this rise is coupled by positive feedback resistor 34 from the collector of transistor 21 to the base of transistor 20 reinforcing the original rise in a regenerative manner. The transistors 20 and 21 are rapidly driven to a state of maximum current conduction due to positive feedback through resistor 34. When transistor 21 attains collector saturation, diode 31 is conducting heavily and has moved to a low resistance condition. This enables the current to bypass resistor 32 permitting most of the drop to be developed across resistor 33 and to appear in output terminal 9. In like manner, a signal is developed in channel 8 and fed to output 10.

The output from channel 7 is also coupled to memory flip-flop circuit 11 comprising transistors 38, 39 via input limiting resistor 30. One of the transistors 38, 39 is conducting at any given time. Assuming that transistor 39 is conducting and transistor 38 is cut off, an output signal from channel 7 is applied to the base of transistor 38 rendering it conductive. When transistor 38 begins to conduct, a negative-going voltage is fed from the collector of transistor 38 to the base of transistor 39 to cause the current flow through transistor 39 to decrease and its collector voltage to rise. The rising collector voltage is fed back to the base of transistor 38 by resistor 44 further increasing the conductivity of transistor 39. This process continues until transistor 38 reaches saturation and transistor 39 is cut off. The coupling by resistor 44 between the collector of transistor 39 and the base of transistor 38 will maintain the transistor 38 in a conducting state even if a positive voltage is no longer emanating from channel 7. In a similar manner, the output from channel 8 is coupled to the base of transistor 39 to make it conductive and thereby subsequently shut off transistor 38. The collector of transistor 39 is connected by way of voltage divider resistors 48, 49 to the base of emitter follower 45. When transistor 39 conducts to saturation, its collector voltage drops to near zero and when applied to the base of transistor 45, makes it nonconductive. Output 12 is connected to the output from emitter follower 45. If a signal appears at output 12, it indicates that transistor 38 is conducting from which it can be inferred that the sun is or last was impinging on solar cell 5. If no signal appears at output 12, transistor 39 is conducting and transistor 38 is cut off indicating that the sun is or last was impinging on solar cell 6. Auxiliary output 13 is identical to output 12.

The following table gives values of resistors, capacitors, and battery potentials which have been used in circuits constructed in accordance with the invention and operated successfully. It should be understood, however, that the invention is not limited to these particular values, or any of them.

Resistor:

| | | |
|---|---|---|
| 26 | ohms | 10K |
| 25 | do | 680K |
| 24 | do | 680 |
| 22 | do | 30K |
| 28 | do | 15K |
| 34 | do | 240K |
| 27 | do | 1K |
| 32 | do | 910 |
| 33 | do | 910 |
| 30 | do | 9,100 |
| 42 | do | 10K |
| 44 | do | 9,100 |
| 40 | do | 5,100 |
| 43 | do | 9,100 |
| 37 | do | 9,100 |
| 56 | do | 10K |
| 55 | do | 5,100 |
| 48 | do | 20K |
| 49 | do | 2,200 |
| 46 | do | 510 |
| 17 | do | 240 |
| 15 | do | 270 |
| 52 | do | 470 |
| 53 | do | 470 |
| 54 | do | 5,100 |
| 51 | do | 5,100 |
| Capacitor: | | |
| 50 | mfd | 1 |
| 35 | mfd | 1 |
| 16 | mfd | 6.8 |
| 36 | mfd | 1 |
| Battery 14 | volts | +28 |
| Junction 60 | do | +12 |

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. Solar energy detection system including a first solar cell, means for exposing said first solar cell to one portion of a selected field of view, means for generating a signal in response to solar energy impinging on said first solar cell, a first trigger circuit for abruptly amplifying said solar signal, a second solar cell, means for exposing said second solar cell to another portion of said selected field of view, means for generating a signal in response to solar energy impinging on said second solar cell, a second trigger circuit for abruptly amplifying said second solar signal, and memory circuit means selectively operable by the amplified solar signals from said first and second trigger circuits to provide an output signal to indicate the solar cell on which the sun is or has last impinged.

2. The combination as defined by claim 1, each of said first and second trigger circuits comprising first and second transistor amplifiers of opposite conductivity, means for applying the output of said first transistor amplifier to said second transistor amplifier, a positive feedback path for regeneratively transmitting the output of said second transistor amplifier to said first transistor amplifier, voltage sensitive means for varying the feedback in said feedback path providing maximum feedback when said first and second transistor amplifiers are in a state of low current conduction whereby said transistors are rapidly driven to a state of maximum conduction.

3. The combination defined by claim 1 including memory circuit output means connected to said memory circuit means, trigger circuit output means connected to said first and second trigger circuits, means for electrically isolating said memory circuit output means and said first and second trigger circuit output means, whereby a short circuit in external circuitry connected to one of said isolated outputs is prevented from short circuiting the entire system.

4. The combination defined by claim 3, said memory circuit output means including means for preventing excessive current drain from said memory circuit means under normal operation or under shorted output conditions.

5. A light sensing device of the kind defined in claim 13 in which each of the trigger circuits comprises first and second transistor amplifiers of opposite conductivity, means for applying the output of said first transistor amplifier to said second transistor amplifier, a positive feedback path for regeneratively transmitting the output of said second transistor amplifier to said first transistor amplifier, voltage sensitive means for varying the feedback in said feedback path providing maximum feedback when said first and second transistor amplifiers are in a state of low current conduction, whereby said transistors are rapidly driven to a state of maximum conduction.

6. The combination as defined by claim 5 in which said voltage sensitive means includes a diode having a high resistance, low current condition when said first and second transistors are in a state of low current conduction, and having a low resistance, high current condition when said first and second transistors are in a state of high current conduction whereby the output impedance of said trigger circuit is reduced when said trigger circuit reaches a state of maximum conduction.

7. A light sensing device including a pair of light sensitive elements arranged in a selected field of view and providing electrical signals when exposed to light, means for lighting the light sensitive elements only one at a time, trigger circuit means connected to the light sensitive elements and providing outputs corresponding to the presence or absence of light on each of the light sensitive elements, and memory circuit means connected to the trigger circuit means and providing an output corresponding to the light sensitive element presently or last exposed to light.

8. A light sensing device for detecting the attitude of the light sensing device relative to the sun, comprising a pair of light sensitive elements providing electrical signals when exposed to rays of the sun, means for exposing the light sensitive elements only one at a time to rays of the sun, a trigger circuit connected to each of the light sensitive elements and providing an output corresponding to the presence or absence of the sun's rays on the associated light sensitive element, and memory circuit means connected to the trigger circuits and providing an output corresponding to the light sensitive element presently or last exposed to the rays of the sun.

9. A device as defined in claim 8 in which the memory circuit means includes a flip-flop circuit.

References Cited

UNITED STATES PATENTS

| | | | |
|---|---|---|---|
| 2,901,669 | 8/1959 | Coleman | 250—212 X |
| 2,971,134 | 2/1961 | Cockrell | 307—88.5 X |
| 3,005,915 | 10/1961 | White et al. | 250—214 |
| 3,033,998 | 5/1962 | Nellis | 307—88.5 X |
| 3,207,948 | 9/1965 | Beguin | 250—214 X |
| 3,028,499 | 4/1962 | Farrall | 250—212 X |
| 3,142,761 | 7/1964 | Rabinow | 250—209 X |

WALTER STOLWEIN, *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,406,304

October 15, 1968

John L. Brewster

It is certified that error appears in the above identified patent and that said Letters Patent are hereby corrected as shown below:

Column 2, line 51, "matreial" should read -- material --. Column 4, line 49, "ringe" should read -- range --. Column 5, line 20, "Thereof" should read -- Therefore --. Column 6, line 27, after "claim 1" insert -- including --.

Signed and sealed this 24th day of February 1970.

(SEAL)

Attest:

Edward M. Fletcher, Jr.

Attesting Officer

WILLIAM E. SCHUYLER, JR.

Commissioner of Patents